United States Patent [19]

Omura et al.

[11] Patent Number: 4,464,297
[45] Date of Patent: Aug. 7, 1984

[54] FIBER REACTIVE BISAZO DYE HAVING BOTH A VINYLSULFONE TYPE REACTIVE GROUP AND AN ORTHO-NITROPHENYL GROUP

[75] Inventors: Takashi Omura, Ashiya; Naoki Harada; Yasuo Tezuka, both of Ibaraki, all of Japan

[73] Assignee: Sumitomo Chemical Company, Limited, Osaka, Japan

[21] Appl. No.: 398,223

[22] Filed: Jul. 14, 1982

[30] Foreign Application Priority Data

Jul. 29, 1981 [JP] Japan .................. 56-119950

[51] Int. Cl.³ .................. C09B 62/513; C09B 62/533; D06P 1/384; D06P 3/66
[52] U.S. Cl. .................. 260/185; 260/190; 260/191
[58] Field of Search .................. 260/185, 148, 190, 191

[56] References Cited

U.S. PATENT DOCUMENTS 2,657,205 10/1953 Heyna et al. .................. 260/185
2,670,265 2/1954 Heyna et al. .................. 260/163 X

FOREIGN PATENT DOCUMENTS 1644198 7/1971 Fed. Rep. of Germany ...... 260/185
43-15299 6/1968 Japan .................. 260/185
45-4337 4/1970 Japan .................. 260/185

*Primary Examiner*—Floyd D. Higel
*Attorney, Agent, or Firm*—Stevens, Davis, Miller & Mosher

[57] ABSTRACT

A bisazo reactive compound represented by a free acid of the formula,

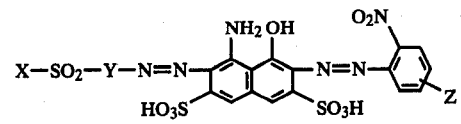

wherein X is $-CH=CH_2$ or $-CH_2CH_2R$ (R is a group capable of being split off with an alkali); Y is phenylene group or naphthylene group, said phenylene group being unsubstituted or substituted by 1-3 identical or different substituent(s) selected from $C_1$-$C_4$ alkyl groups, $C_1$-$C_4$ alkoxy groups, chlorine atom and bromine atom, and said naphthylene group being unsubstituted or substituted by 1-3 sulfonic acid group(s); and Z is hydrogen atom, halogen atom, nitro group, cyano group, $C_1$-$C_4$ alkyl group or $C_1$-$C_4$ alkoxy group. The compound is useful for dyeing cellulose, polyamide or polyurethane fibers in a blue-black color having excellent fastnesses, particularly chlorine fastness, and excellent built-up property.

8 Claims, 1 Drawing Figure

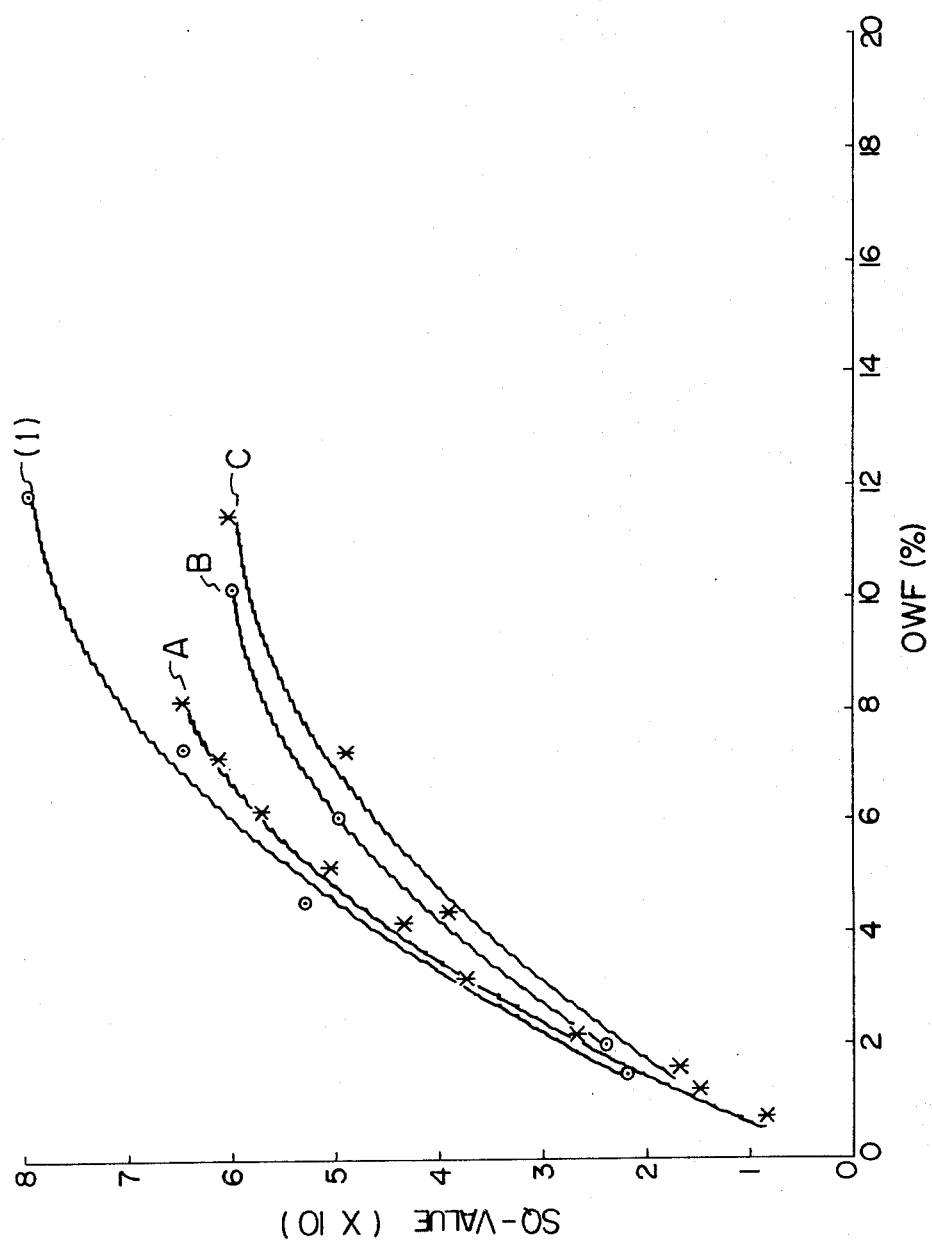

FIBER REACTIVE BISAZO DYE HAVING BOTH A VINYLSULFONE TYPE REACTIVE GROUP AND AN ORTHO-NITROPHENYL GROUP

This invention relates to a novel reactive mono-functional bisazo dye useful for dyeing fiber materials a blue-black color.

As reactive dye useful for dyeing cellulose fibers a blue-black color, there has hitherto been known C.I. Reactive Black 5, obtainable by diazotizing 2 moles of 1-aminobenzene-4-β-sulfatoethylsulfone and then coupling the diazotized product with 1 mole of 1-amino-8-hydroxynaphthalene-3,6-disulfonic acid. However, the product dyed with this dye is insufficient in various fastnesses.

Published Examined Japanese Patent Application No. 15,299/1968 discloses bisazo reactive dyes which can dye cellulose fibers in a blue-black color having good wet color fastness and light fastness. However, all these dyes need improvements in various fastnesses, particularly chlorine fastness, as well as in exhaustion yield, fixation yield and build-up property. For example, a dye represented by the following formula:

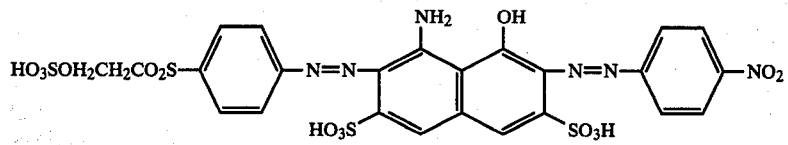

is disclosed in Example 1 of the specification of the above-mentioned patent application, which had a chlorine fastness of 1 grade as measured by ISO method and was still insufficient with respect to exhaustion yield, fixation yield and build-up property.

Further, similar bisazo reactive dyes are disclosed in Published Examined Japanese Patent Application No. 4,337/1970, which also have practical problems left unsolved in point of fastnesses, particularly chlorine fastness, as well as exhaustion yield, fixation yield or build-up property.

The present inventors have conducted elaborate studies with the aim of overcoming these problems, and found a reactive mono-functional bisazo compound represented by a free acid of the formula (I):

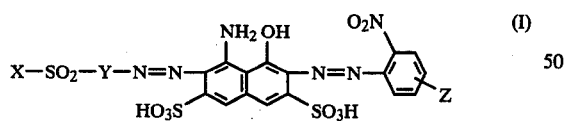

wherein X is $-CH=CH_2$ or $-CH_2CH_2R$ (R is a group capable of being split off with an alkali); Y is phenylene or naphthylene group, said phenylene group being unsubstituted or substituted by 1-3 identical or different substituent(s) selected from $C_1-C_4$ alkyl groups, $C_1-C_4$ alkoxy groups, chlorine atom and bromine atom and said naphthylene group being unsubstituted or substituted by 1-3 sulfonic acid group(s); and Z is hydrogen atom, halogen atom, nitro group, cyano group, $C_1-C_4$ alkyl group or $C_1-C_4$ alkoxy group.

In the bisazo dye of this invention represented by the formula (I), the group R capable of being split off with alkali is, for example, halogen atom such as chlorine or bromine atom, or ester group of organic carboxylic or sulfonic acid such as lower alkanoyloxy residue (for example, acetyloxy residue), benzoyloxy residue or benzenesulfonyloxy residue, or acidic ester residue of phosphoric acid or sulfuric acid represented by $-OPO_3H_2$ or $-OSO_3H$ in the form of free acid, and the like.

The bisazo compound of this invention can exist not only in the form of free acid but also in the form of a salt. Preferably, however, it exists in the form of a salt, particularly in the form of an alkali metal or alkaline earth metal salt, and more particularly in the form of a sodium, potassium or calcium salt. A still more preferable form is an alkali metal salt.

As residue Y, the residues of the following formulas can be referred to particularly:

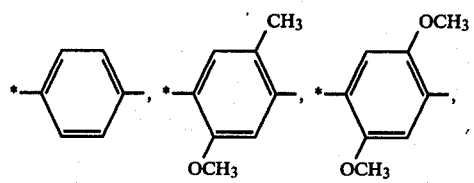

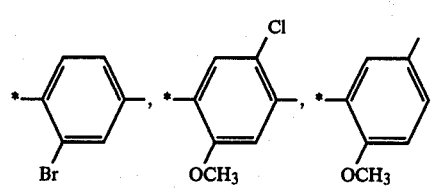

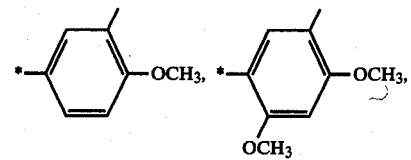

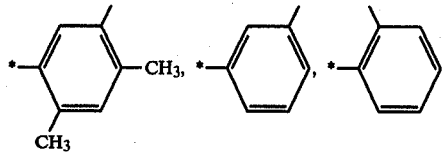

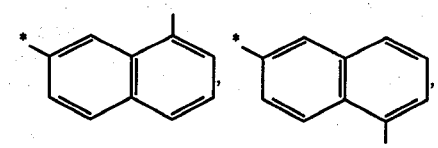

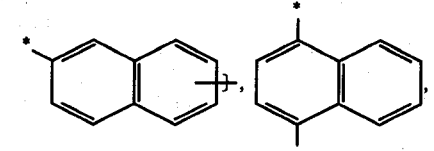

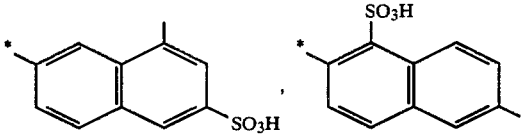

wherein the asterisked linkages are linkages connecting with the —N=N— group of the coupler.

Among the novel compounds of this invention, preferred is a compound represented by a free acid of the formula,

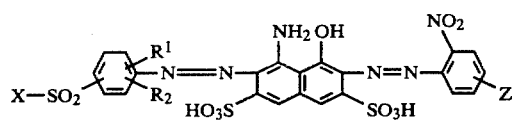

wherein X and Z are as defined above, and $R_1$ and $R_2$ are each hydrogen or halogen (preferably, chlorine, bromine) atom, or $C_1$-$C_4$ alkyl (preferably, methyl, ethyl) or $C_1$-$C_4$ alkoxy (preferably, methoxy, ethoxy) group.

The novel compound of the formula (I) can be prepared by diazotizing an o-nitroaniline derivative represented by the following formula (2):

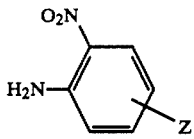 (2)

wherein Z is as defined above, by a well-known process and then coupling the diazotized product with a monoazo compound represented by a free acid of the formula (3):

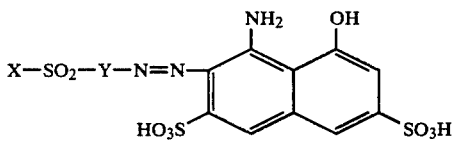 (3)

wherein X and Y are as defined above, by a well-known process.

The monoazo compound of the formula (3) can be prepared by diazotizing an amine represented by the following formula (4):

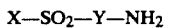 (4)

wherein X and Y are as defined above, by a well-known process and then coupling the diazotized product with 1-amino-8-hydroxynaphthalene-3,6-disulfonic acid at a pH of 3 or less, at a temperature of $-10°$ C. to $+30°$ C., over a time period of 2-10 hours.

Examples of the o-nitroaniline derivatives represented by the formula (2) include o-nitroaniline, 2,4- or 2,5-dinitroaniline, 4- or 5-methyl-2-nitroaniline, 4- or 5-methoxy-2-nitroaniline, 4- or 5-chloro-2-nitroaniline, and 4- or 5-cyano-2-nitroaniline.

Examples of the amine represented by the formula (4) include 1-aminobenzene-2-, -3- or -4-$\beta$-sulfatoethylsulfone,
1-aminobenzene-3-$\beta$-phosphatoethylsulfone,
1-amino-4-methylbenzene-3-$\beta$-sulfatoethylsulfone,
1-aminobenzene-3-$\beta$-chloroethylsulfone,
1-amino-4-methoxybenzene-3-$\beta$-sulfatoethylsulfone,
1-aminonaphthalene-4-$\beta$-sulfatoethylsulfone,
1-amino-2,5-dimethoxybenzene-4-$\beta$-sulfatoethylsulfone,
1-amino-2-methoxybenzene-4-$\beta$-sulfatoethylsulfone,
1-amino-2-chlorobenzene-4-$\beta$-sulfatoethylsulfone,
1-amino-2-methoxybenzene-5-$\beta$-sulfatoethylsulfone,
2-aminonaphthalene-5,6,7 or 8-$\beta$-sulfatoethylsulfone,
2-aminonaphthalene-8-$\beta$-sulfatoethylsulfone-6-sulfonic acid,
1-amino-2,4-dimethoxybenzene-5-$\beta$-sulfatoethylsulfone,
1-amino-2-methoxy-5-methylbenzene-4-$\beta$-sulfatoethylsulfone,
1-amino-2,5-diethoxybenzene-4-$\beta$-sulfatoethylsulfone,
1-amino-2-bromobenzene-4-$\beta$-sulfatoethylsulfone,
1-amino-2-bromobenzene-4-vinylsulfone,
2-aminonaphthalene-8-$\beta$-phosphatoethylsulfone-6-sulfonic acid,
2-aminonapthalene-6-vinylsulfone-1-sulfonic acid,
1-amino-2-methoxy-5-methylbenzene-4-$\beta$-chloroethylsulfone,
1-aminobenzene-2-, -3- or -4-vinylsulfone.

All the starting compounds mentioned above exist in the form of acid and/or salt, particularly in the form of alkali metal salt, depending on the reaction conditions, or they are used in such form.

The compound prepared according to this invention may be separated by a known process, for example, by salting-out the reaction mixture using an electrolyte such as sodium chloride or potassium chloride or by subjecting the reaction mixture to evaporation, such as spraying or the like.

The novel compound of this invention has a fiber-reactivity, so that it exhibits quite excellent performances in dyeing (including printing) materials composed of cellulose fibers, natural and synthetic polyamides and polyurethane fibers.

As preferable examples of said cellulose fibers, cotton, regenerated cellulose and other vegetable fibers such as linen, hemp and jute can be mentioned. As examples of said polyamide fibers, natural and synthetic fibers such as wool, other animal furs, silk, polyamide-6,6, polyamide-6, polyamide-11, polyamide-4 and the like can be referred to.

The compound of this invention is applicable to cellulose fibers with a particular excellency.

In the case of exhaustion process, the dyeing of cellulosse fibers is carried out at a relatively low temperature in a dyeing bath containing sodium sulfate or sodium chloride in the presence of an acid-binding agent such as sodium carbonate, sodium tertiary phosphate, sodium hydroxide and the like. Dyeing by a printing process is also possible, which is carried out by printing a fiber with a color paste containing an acid-binding agent such as sodium bicarbonate, sodium carbonate, trisodium phosphate, sodium hydroxide or the like, urea and a sizing agent (preferably, sodium alginate or the like), subjecting the fiber to an intermediate drying and then heating it at 100°–200° C. with steam or in dryness.

Further, the dyeing of this invention may also be carried out by a continuous process, or by the cold.pad.-batch.up dyeing process.

The dyeing of polyamide fiber, polyurethane fiber and leather can be practised in an acidic medium by a known method. For example, ammonium acetate or the like may be added to the dyeing bath in order to obtain a desired pH value. In order to obtain a level dyeing property, it is preferable to add a leveling assistant comprising, as a base, the usual leveling assistant such as the reaction product of cyanuric chloride and 3 moles, per one mole of the cyanuricchloride, of aminobenzenesulfonic acid and/or aminonaphthalenesulfonic acid and/or, for example, the reaction product of stearylamine and ethylene oxide. The dyeing can be practised at a temperature of 60° C. or higher (for example, at the boiling point of aqueous dyeing bath) and optionally at a temperature not higher than 120° C. under elevated pressure.

It is a surprising fact that, though the compound of this invention has only one fiber-reactive group per molecule, it can dye cellulose fibers much more deeply than does C.I. Reactive Black 5 having two fiber-reactive groups in one molecule. Further, the compound of this invention is excellent in build-up property and the dyed product obtained therefrom is more excellent in fastness than the dyed product obtained from C.I. Reactive Black 5.

Further, as compared with the dyes mentioned in Published Examined Japanese Patent Application Nos. 15,299/1968 and 4,337/1970, the compound of this invention exhibits a higher exhaustion yield, fixation yield and build-up property when used for dyeing and the dyed product obtained therefrom is more excellent in chlorine fastness than the dyed products obtained from the above-mentioned known dyes.

That is, as compared with the following dye disclosed in Published Examined Japanese Patent Application No. 15,299/1968:

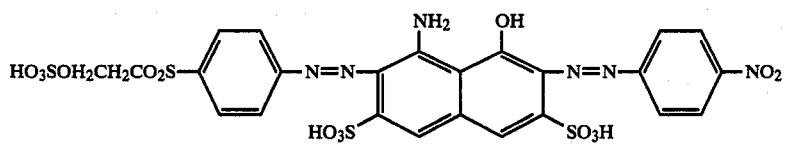

and the following dye disclosed in Published Examined Japanese Patent Application No. 4,337/1970:

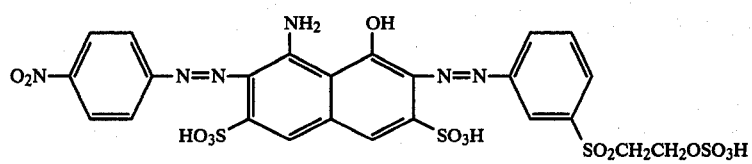

the compound of this invention can be fixed much more effectively not only in the case of light color dyeing but also in the case of deep color dyeing, so that the necessary amount of dye can be decreased to a great extent. Further, the compound of this invention has a chlorine fastness of 3 grade or 3-4 grade, while the above-mentioned known dyes have a chlorine fastness of 1 grade.

This invention will be explained in more detail with reference to examples, wherein parts are by weight.

EXAMPLE 1

After mixing and dissolving together 6.9 parts of o-nitroaniline, 0.3 part of Emulgen 930 (a surfactant produced by Kao-Atlas Co., Ltd.), 11.3 parts of hydrochloric acid and 150 parts of water, 3.8 parts of sodium nitrite was added thereto, and diazotization was carried out at a temperature not higher than 10° C. Two hours later, excess nitrous acid was removed by the use of sulfamic acid, and then a neutral aqueous solution containing 33.85 parts of trisodium 1-amino-2-(4-β-sulfatoethylsulfonylphenylazo)-8-hydroxynaphthalene-3,6-disulfonate was added. At 10°-20° C., the mixture was kept at a pH value of 4-7 for 3 hours by dropwise adding a 15% aqueous solution of sodium carbonate. When the diazonium compound had become undetectable, the mixture was salted out at pH 4-6 at 30°-40° C. and filtered. The wet cake thus obtained was dissolved in water. An equimolar amount of sodium phosphate, monobasic was then added. The pH of the solution was adjusted to 5-6, and then the product was dried. Thus, a compound represented by the following formula (1) in the form of free acid was obtained:

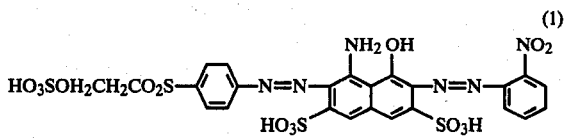

[$\lambda_{max}$ 606 nm (in water solvent)]

EXAMPLES 2-18

Using the starting compounds as shown in the following table, the procedure of Example 1 was repeated to obtain the corresponding dyes, which were able to dye cotton in a greenish black color.

TABLE

| Example No. | o-Nitroaniline derivative of the formula (2) | Amine of the formula (4) |
|---|---|---|
| 2 | 2-nitroaniline (O$_2$N and H$_2$N on adjacent positions of benzene) | 3-aminophenyl-SO$_2$CH$_2$CH$_2$OSO$_3$H |
| 3 | " | 2-methoxy-5-(SO$_2$CH$_2$CH$_2$OSO$_3$H)aniline (OCH$_3$ ortho to NH$_2$) |
| 4 | " | 4-methoxy-3-(SO$_2$CH$_2$CH$_2$OSO$_3$H)aniline |
| 5 | " | 4-amino-5-methoxy-2-methylphenyl-S-CO-CH$_2$CH$_2$OSO$_3$H (HO$_3$SOH$_2$CH$_2$CO$_2$S- on benzene with OCH$_3$, CH$_3$, NH$_2$) |
| 6 | 4-methyl-2-nitroaniline | 4-aminophenyl-S-CO-CH$_2$CH$_2$OSO$_3$H (HO$_3$SOH$_2$CH$_2$CO$_2$S-C$_6$H$_4$-NH$_2$) |
| 7 | 4-methoxy-2-nitroaniline | " |
| 8 | 4-chloro-2-nitroaniline | " |
| 9 | 2,4-dinitroaniline | " |
| 10 | 2,5-dinitroaniline | " |

TABLE-continued

| Example No. | o-Nitroaniline derivative of the formula (2) | Amine of the formula (4) |
|---|---|---|
| 11 | 2-amino-4-methyl-1-nitrobenzene (O$_2$N, H$_2$N, CH$_3$) | " |
| 12 | 2-amino-4-cyano-1-nitrobenzene (O$_2$N, H$_2$N, CN) | " |
| 13 | 2-amino-1-nitrobenzene (O$_2$N, H$_2$N) | 2-amino-6-(vinylsulfonyl)naphthalene-1-sulfonic acid (H$_2$N—naphthalene—SO$_3$H, SO$_2$CH=CH$_2$) |
| 14 | 2-amino-4-methoxy-1-nitrobenzene (O$_2$N, H$_2$N, OCH$_3$) | 7-amino-1-(2-sulfatoethylsulfonyl)naphthalene (H$_2$N—naphthalene—SO$_2$CH$_2$CH$_2$OSO$_3$H) |
| 15 | 2-amino-1-nitrobenzene (O$_2$N, H$_2$N) | H$_2$O$_3$POH$_2$CH$_2$CO$_2$S—C$_6$H$_4$—NH$_2$ |
| 16 | 2-amino-4-ethoxy-1-nitrobenzene (O$_2$N, H$_2$N, OC$_2$H$_5$) | HO$_3$SOH$_2$CH$_2$CO$_2$S—C$_6$H$_4$—NH$_2$ |
| 17 | 2-amino-4-ethyl-1-nitrobenzene (O$_2$N, H$_2$N, C$_2$H$_5$) | HO$_3$SOH$_2$CH$_2$CO$_2$S—C$_6$H$_4$—NH$_2$ |
| 18 | 2-amino-4-n-butyl-1-nitrobenzene (O$_2$N, H$_2$N, C$_4$H$_9$—n) | " |
| 19 | 2-amino-1-nitrobenzene (O$_2$N, H$_2$N) | HO$_3$SOH$_2$CH$_2$CO$_2$S—C$_6$H$_4$—NH$_2$ (ortho) |
| 20 | 2-amino-4-chloro-1-nitrobenzene (O$_2$N, H$_2$N, Cl) | " |

TABLE-continued

| Example No. | o-Nitroaniline derivative of the formula (2) | Amine of the formula (4) |
|---|---|---|
| 21 | 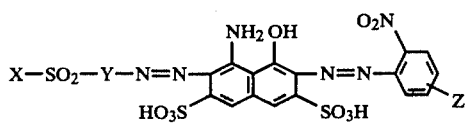 | " |

EXAMPLE 22

A predetermined amount of the compound obtained in Example 1 was dissolved into 200 parts of water, to which was added 10 parts of sodium sulfate. After adding 10 parts of cotton, the temperature was elevated to 60° C. 30 Minutes thereafter, 4 parts of sodium carbonate was added and dyeing was carried out at that temperature for one hour. Thereafter, the cotton was washed with water and soaped to obtain a greenish black colored dyed product excellent in various fastnesses, particularly chlorine fastness.

Dyeing property of the compound (1) of this invention was compared with those of the known dyes (A), (B) and (C) as shown below.

C.I. Reactive Black 5

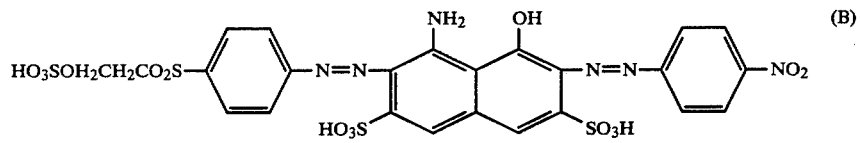

The dye disclosed in Published Examined Japanese Patent Application No. 15,299/1968

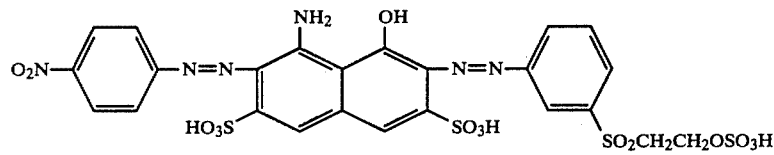

The dye disclosed in Published Examined Japanese Patent Application No. 4,337/1970

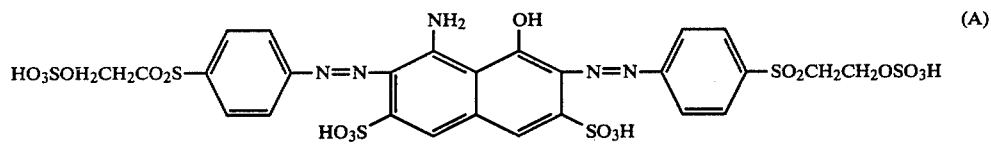

The results are as shown in the drawing.

The drawing shows a relationship between OWF(%) and SQ-VALUE, the OWF(%) being the value obtained by dividing the amount of the dye used by the amount of cotton used, and the SQ-VALUE being the amount of fixed dye per unit area of the dyed cotton.

In the drawing, the line (1) shows data of the dye obtained in Example 1, and the lines (A), (B) and (C) show data of the abovesaid dyes (A), (B) and (C), respectively.

As apparent from the results, the dye (1) of this invention gives a much deeper color in the whole region from a low-concentration dyeing to a high-concentration dyeing than any of the comparative dyes (A), (B) and (C), and is more excellent in build-up property than those.

What is claimed is:

1. A compound represented by a free acid of the formula,

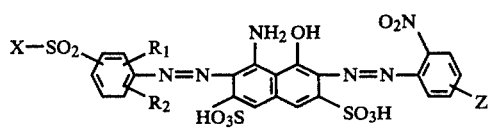

wherein X is $-CH=CH_2$ or $-CH_2CH_2R$ (R is a group capable of being split off with an alkali); Y is phenylene or naphthylene, said phenylene being unsubstituted or substituted by 1-3 identical or different substituent(s) selected from $C_1$-$C_4$ alkyl, $C_1$-$C_4$ alkoxy, chlorine and bromine, and said naphthylene being unsubstituted or substituted by 1-3 sulfonic acid group(s); and Z is hydrogen, halogen, nitro, cyano, $C_1$-$C_4$ alkyl or $C_1$-$C_4$ alkoxy.

2. A compound represented by a free acid of the formula, wherein X is $-CH=CH_2$ or $-CH_2CH_2R$ (R is a group capable of being split off with an alkali, Z is hydrogen, halogen, nitro, cyano, $C_1$-$C_4$ alkyl or $C_1$-$C_4$ alkoxy, and $R_1$ and $R_2$ are each hydrogen or halogen, or $C_1$–$C_4$ alkyl or $C_1$–$C_4$ alkoxy.

3. A compound according to claim 2, wherein X is —$CH_2CH_2OSO_3H$.

4. A compound according to claim 3, wherein Z, $R_1$ and $R_2$ are all hydrogen.

5. A compound according to claim 3, wherein the Z substituent is at the position para to the azo substituent.

6. A compound represented by a free acid of the formula,

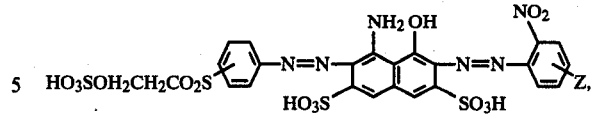

wherein —$SO_2CH_2CH_2OSO_3H$ is located at o-, m- or p-position to the azo substituent and Z' is hydrogen, chlorine, bromine, methyl, ethyl, methoxy or ethoxy.

7. A compound according to claim 6, wherein Z' is chlorine, bromine, methyl, ethyl, methoxy or ethoxy.

8. A compound according to claim 7, wherein the Z' substituent is at the position para to the azo substituent.

* * * * *